J. F. KOELLING.
LITTER CARRIER.
APPLICATION FILED OCT. 11, 1918.
1,318,390.
Patented Oct. 14, 1919.
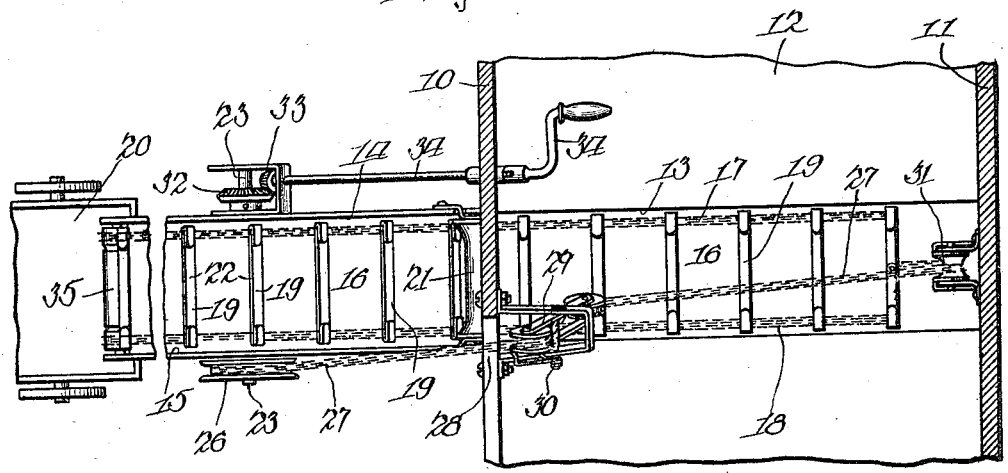
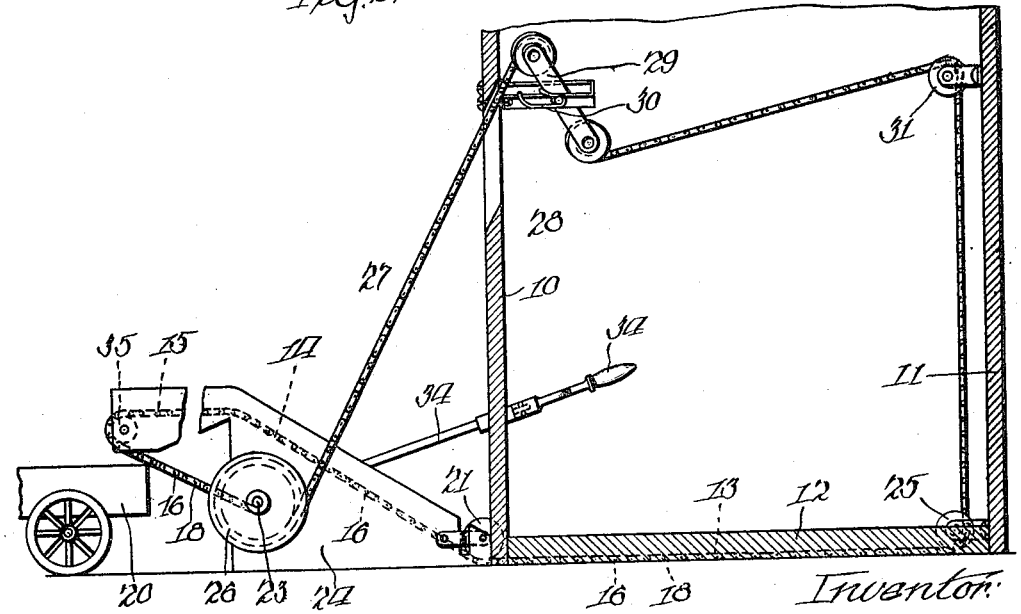

UNITED STATES PATENT OFFICE.

JULIUS F. KOELLING, OF CHICAGO, ILLINOIS.

LITTER-CARRIER.

1,318,390.      Specification of Letters Patent.      Patented Oct. 14, 1919.

Application filed October 11, 1918. Serial No. 257,695.

*To all whom it may concern:*

Be it known that I, JULIUS F. KOELLING, a citizen of the United States, residing at Chicago, in the county of Cook and State of Illinois, have invented certain new and useful Improvements in Litter-Carriers, of which the following is a specification.

My invention relates to litter carriers, and has for its primary object the provision of an improved device of this character which shall have improved means for clearing a stable of litter and for delivering the litter into a wagon or at any other desired place. A further object is to provide a litter carrier which shall be easily and quickly operable. A further object is to provide a litter carrier which shall be operable by an overhead chain or cable and shall be so arranged that litter cannot be carried onto the overhead portion of said chain to drop upon objects beneath.

Other objects and advantages of the invention will appear from the following description, taken in conjunction with the accompanying drawings which form a part of this specification and illustrate the preferred embodiment of the invention.

In the drawings:

Figure 1 is a plan view of the invention, with portions broken away, and showing the tail of a wagon in position to receive litter from the carrier.

Fig. 2 is a side elevation thereof.

Reference numeral 10 indicates the front wall, 11 the back wall, and 12 the floor of a stable having a trough 13 for catching the manure dropped by cattle. The trough extends through the front wall 10 and communicates with an upwardly and outwardly extending trough 14 which terminates in a horizontal projection 15 spaced above the ground sufficiently to admit the tail 20 of a wagon or manure spreader beneath it. Lying in the troughs 13, 14 and 15 is an apron generally indicated at 16 and comprising parallel side chains 17 and 18 and spaced cross bars 19, the latter lying flat on the bed of the troughs and scraping that bed. At the obtuse angle formed by troughs 13 and 14 the apron is held down to the bed of each trough by a spool-shaped roller 21 the ends of which hold chains 17 and 18 and their cross-bars 19 depressed, while the median portion of the spool, being of reduced diameter, permits the litter on the apron to pass through wall 10 without being displaced upon the apron. If desired the cross-bars 19 may comprise short lengths of angle iron having one web upstanding as at 22. The shape of these webs 22 is such that they pass freely beneath roller 21, and they serve to prevent litter from slipping downward when being raised in trough 15.

A shaft 23 is journaled in the support 24 for the trough 15, and the outer end of the apron is secured to this shaft while its inner end extends inwardly to a sheave 25 near the rear wall 11 and in trough 13. Outside of support 24 the shaft 23 carries a fixed reel 26 to which is secured the outer end of an operating chain or cable 27. This cable passes into the stable through an aperture 28 provided therefor and over a tightener 29 actuated by a spring 30 to keep the cable taut at all times. From the tightener, which is preferably more than six feet above the floor, the upper substantially horizontal reach of the cable extends to the back wall 11 where it runs over a sheave 31 and thence down over the rear and lower portions of the periphery of sheave 25; beneath sheave 25 the cable 27 is secured to one of the cross-bars 19 of the apron 16.

The end of shaft 23 opposite reel 26 carries a beveled gear 32, meshed by a beveled pinion 33, the latter being rotated by a hand crank 34 accessible from within the stable.

In the operation of the invention, and considering the parts as initially in the position illustrated, straw is scattered lightly over that portion of the apron lying between walls 10 and 11 and the droppings are received thereon. When it is desired to clean the stable the operator rotates crank 34 in a clockwise direction, it being understood that reel 26 carries a considerable length of cable 27 coiled upon it. This rotation winds apron 16 up on shaft 23, and the apron, traveling outwardly on the bed of trough 13, drags cable 27 after it, thereby unwinding the cable from reel 26. This operation is continued until the rear or inner end of the apron has passed over the roller 35 at the outer end of horizontal trough portion 15. As the apron passes outwardly it deposits its litter on the wagon 20 and is wound up on the shaft 23, a corresponding amount of cable 27 being unrolled from reel 26. The diameter of chain initially present on reel 26 is greater than the initial diameter of shaft 23, so that during the first part of the litter discharging operation just described a greater length of cable will unroll from the reel than will be wound up on shaft 23; thus the unrolled combined length of apron and cable will be greatest during the intermediate portion of the outer or inner travel of the apron. As the diameter of reeled cable diminishes that of reeled apron increases, so that during the latter half of the outward movement of the apron the cable is unreeled more slowly than the apron is reeled, bringing the combined unrolled length of cable and apron back to that initially present. The function of tightener 29 is to take up the slack thus produced and maintain the apron and cable taut.

When the inner end of the apron has passed over roller 35 all of the litter has dropped from the apron into wagon 20. The rotation of crank 34 is now reversed, thereby winding cable 27 up on reel 26 and causing the cable to drag the apron back to initial position in trough 13. It will be noted that no portion of the litter receiving apron travels overhead, but that that apron, within the stable, moves only along the bed of trough 13. Therefore, if any litter has stuck to the apron instead of dropping into the wagon, that litter is not carried overhead where it might drop upon dairymen beneath but is kept in the trough and carried out at the next operation of the apron. Of course a part of chain 27 travels along the bed of trough 13 when the apron is dumping its litter, but the trough is scraped clean of litter before this part of the chain traverses it, so that the chain does not carry litter overhead between tightener 29 and sheave 31. Applicant, therefore, avoids the expense of excavating beneath a stable floor to accommodate the return reach of an apron or cable while he secures cleanliness overhead and the advantages of an endless line in the operation of the litter apron. Obviously, however, many of the advantages of the invention would be obtained by passing cable 27 beneath the floor 12 if that arrangement were found convenient.

While I have illustrated and described the preferred embodiment of my invention, it will be seen that one skilled in the art might make modifications thereof without departing from the spirit of the invention. I wish, therefore, not to be restricted to the precise embodiment shown, except in so far as the same is limited in the appended claims.

I claim:

1. In a litter carrier, the combination with supporting means defining a trough, of an apron reciprocable therein, a sheave in said trough, an overhead sheave, an overhead cable tightener, a shaft, a cable reel keyed on the shaft, and a cable wound on the reel, passing around the tightener and said overhead sheave and the trough sheave and secured by its free end to the inner end of said apron, the outer end of the apron being wound upon said shaft.

2. The combination with supporting means defining a litter trough, of an apron reciprocable from and into said trough, and apron reciprocating devices including chain actuating mechanism and a chain secured by its ends to the inner and outer ends respectively of the apron and so guided as to enter the trough only after the trough has been cleaned by the apron.

3. In a litter carrier, the combination with supporting means, of an apron mounted therein for reciprocation, and apron reciprocating devices comprising a single shaft, and a chain; said apron and chain being arranged to be wound in opposite directions about the axis of said shaft.

In testimony whereof I affix my signature.

JULIUS F. KOELLING.

Copies of this patent may be obtained for five cents each, by addressing the "Commissioner of Patents, Washington, D. C."